UNITED STATES PATENT OFFICE.

GEORGE G. GRISWOLD, OF CHESTER, CONNECTICUT.

IMPROVED ARTIFICIAL GRINDSTONE.

Specification forming part of Letters Patent No. 45,243, dated November 29, 1864.

*To all whom it may concern:*

Be it known that I, GEORGE G. GRISWOLD, of Chester, in the county of Middlesex, State of Connecticut, have invented, made, and applied to use certain Improvements in Grindstones; and I do declare the following to be a full, clear, and correct description of the same, reference being had to the accompanying specimens.

The nature of my invention consists in combining sand with hydraulic cement to form a substitute for the natural grindstone, which substitute shall possess the advantages hereinafter fully set forth.

To enable those skilled in the arts to make and use my invention, I will describe the mode pursued by me in manufacturing the same.

I take common sand and sift it to any desired degree of fineness. I then thoroughly incorporate the sifted sand with hydraulic cement and place the product in a mold, which mold corresponds in form and size to the artificial stone to be made. The mold, with its contents, is then placed in a screw-press, or a press operated by a lever, by which pressure the sand and hydraulic cement are firmly united, and after being removed from the press may be allowed to stand a few days until thoroughly dry, when the artificial stone thus formed is ready for use.

The advantages resulting from the manufacture of my improved grindstone may be thus enumerated. The grindstone is perfectly uniform throughout as to grit. No "pins" occur, as in the natural grindstone, and the same may be made as coarse or as fine as desired, while the cost will be found to be but about one-fourth that of the ordinary stone.

In order that the center of the grindstone may be formed, a core is placed in the mold; or a center formed of iron and provided with prongs may be placed in the mold, and during the pressing operation the prongs will be inserted into the composition and remain firmly therein.

I do not intend to confine my invention simply to grindstones, as I am aware that a substitute for the common whetstone may be made in the same manner.

Having thus described my improvement, what I claim therein as new, and desire to secure by Letters Patent, is—

Combining sand with hydraulic cement to form a substitute for the common grindstone, when the same shall be combined substantially as herein described.

GEORGE G. GRISWOLD.

In presence of—
SOCRATES DENISON.
HOMER SHAILER.